United States Patent [19]

Frommeyer et al.

[11] Patent Number: 5,944,914
[45] Date of Patent: Aug. 31, 1999

[54] ALUMINOTHERMIC MIXTURE WITH FERROCHROMIUM ALLOY

[75] Inventors: Georg Frommeyer, Erkrath; Michael Kulse, Oberhausen; Gerhardus Mulder; Michael Steinhorst, both of Essen, all of Germany

[73] Assignee: Elektro-Thermit GmbH, Essen, Germany

[21] Appl. No.: 08/975,313

[22] Filed: Nov. 21, 1997

[30] Foreign Application Priority Data

Dec. 4, 1996 [DE] Germany .......................... 196 50 207

[51] Int. Cl.⁶ .................................................. B23K 35/362
[52] U.S. Cl. .................................. 148/24; 148/26; 75/303; 75/315
[58] Field of Search ............................ 148/24, 25, 26; 75/303, 315, 252

[56] References Cited

FOREIGN PATENT DOCUMENTS 36 44 106 C1  3/1988  Germany .
1723147     3/1992  U.S.S.R. ................... 148/26
986808      3/1965  United Kingdom ...... 75/315

*Primary Examiner*—George Wyszomierski
*Attorney, Agent, or Firm*—Scully, Scott, Murphy & Presser

[57] ABSTRACT

The invention relates to an aluminothermic mixture consisting of a finely particulate base portion of iron oxides and aluminum as well as metallic additives, wherein a master alloy, namely a ferrochromium alloy consisting of (in % by weight)

C: 0.1 to 20

Si: 2 to 40

Cr: 5 to 80 and iron with impurities resulting from manufacture and, if appropriate, other alloying elements, is added in a quantity of from 5 to 50% by weight, relative to the base portion, as metallic additive.

10 Claims, No Drawings

ALUMINOTHERMIC MIXTURE WITH FERROCHROMIUM ALLOY

FIELD OF THE INVENTION

The invention relates to an aluminothermic mixture consisting of a granular blend of iron oxides, aluminum and additives, such as alloy formers and damping agents.

The invention relates in particular to an aluminothermic mixture for rail welding.

BACKGROUND OF THE INVENTION

In the known method of aluminothermic rail welding, in which the rail ends, laid with a gap and surrounded by a casting mold, are fused by aluminothermically generated steel and joined to one another, the aluminothermically generated steel serving as weld material should, in its strength properties, correspond as far as possible to the rail steel.

This demand is met in the known aluminothermic mixtures—also called welding portions through addition of alloy elements, such as, in particular, carbon, manganese, vanadium and titanium, to the base mixture consisting of aluminum and iron oxides. For damping and cooling, iron and/or steel scrap are also mixed with the aluminothermic mixture, which simultaneously increases the steel yield.

The preferred rail steels having tensile strengths of from 690 to 880 $N/mm^2$ have carbon contents of from 0.4 to 0.82% and manganese contents 1 from 0.8 to 1.7% and correspondingly a microstructure which is of predominantly pearlitic form.

DE-C-36 44 106 provides an aluminothermic mixture which ensures the generation of a weld material having an enhanced reproducibility of the composition. This is intended in particular to ensure that the microstructure of the weld material corresponds to the microstructure of the rail material.

This aluminothermic mixture contains additives in the form of homogeneous granules, in particular alloy metals, such as, for example, Mn, Cr, Ni, V and Ti, which can be employed in pure form or as alloys, for example with Fe, damping agents, such as, for example, Fe or Fe alloys, and also carburizing agents, such as carbon or C-containing metals, alloys or carbides.

For the welding of rails, granules consisting of carbon, manganese and iron are added to the mixture in a quantity which ensures the formation of a pearlitic microstructure in the aluminothermically generated steel. Preferably, the granules consist of 1.5 to 3% by weight of carbon, 8 to 12% by weight of manganese and 85 to 90.5% by weight of iron. In some cases, manganese contents of up to 80% are employed.

BRIEF SUMMARY OF THE INVENTION

The present invention has as an object providing an aluminothermic mixture which shows a calmer reaction behavior with reduced smoke formation, improves the morphology of the weld surface and satisfies the more stringent demands for a weld which is more wear-resistant. In addition, the integrity of the weld should be further improved.

In particular, it is an object of the invention to enhance even further the safety of products which include an aluminothermically produced weld.

The aluminothermic mixture according to the invention is thus composed of a finely particulate base portion of iron oxide and aluminum as well as metallic additives, wherein a master alloy, namely a ferrochromium alloy consisting of (in % by weight)

C: 0.1 to 20

Si: 2 to 40

Cr: 5 to 80 and iron with impurities resulting from manufacture, is added in a quantity of from 5 to 50% by weight, relative to the base portion, as metallic additive.

Another aspect of the invention is the methods wherein aluminothermic mixtures are formed by adding together iron oxide, aluminum and master alloy as described herein.

Further advantageous embodiments of the aluminothermic mixture result from varying the proportions by weight of the master alloy and of the quantities to be added.

DETAILED DESCRIPTION OF THE INVENTION

In setting the quantities of the additives, it is important that account is taken of both burn-off of the alloying elements caused by the aluminothermic reaction and the additional alloying of the damping component consisting of iron. At the same time, it must be ensured that the aluminothermically generated steel can achieve the casting temperature necessary for welding. The mutual ratio of the additives, the quantity of damping iron in the aluminothermic mixture and the requisite total quantity of additives can be determined by simple preliminary tests. This is readily possible for a person skilled in the art without an inventive step.

The quantity of additives depends, on the one hand, on the composition of the master alloy and, on the other hand, on the concentrations of alloy materials in the weld.

The greater the hardness of the weld is to be, the more alloying elements are required, that is to say the more master alloy must be used and the more alloying elements must already be present in the master alloy.

If a master alloy with, for example, high Cr contents of, for example, up to 80 or even 90%, is used, the other alloying elements Si and C must be correspondingly adjusted and, for a desired hardness, correspondingly less master alloy needs to be employed. This can readily be determined by appropriate smelting of master alloys of varying composition and subsequent welding trials.

If master alloys having lower Cr contents are used, more master alloy needs to be employed.

In this case, the master alloy can additionally contain grain-refining elements, such as boron, vanadium, titanium, niobium or rare earth metals, or it can also be alloyed with metals such as nickel, molybdenum, copper or tungsten and other desired additives.

Grain-refining constituents and the rare earths are usually added in a quantity which produces a content of <1% in the weld.

The other possible alloying additives are added to the master alloy in such a quantity that they are present in the weld in a quantity of up to 4%.

The base portion usually consists of about 25% of aluminum and 75% of iron oxides in various oxidation states.

As discussed above, the rail steels used nowadays are preferably defined by carbon contents of from 0.4 to 0.82% by weight and manganese contents of from 0.8 to 1.7% by weight and correspondingly show a predominantly pearlitic microstructure with lamellar ferrite and cementite ($Fe_3C$).

If the mixture according to the invention is to be used for welding such rails, the metallic additives should be present in a quantity which ensures the formation of a predominantly pearlitic microstructure in the aluminothermically generated steel.

With this mixture, it is also possible to produce a microstructure having bainitic fractions. In addition, troostite and sorbite, which are very fine pearlite stages, are then observed.

Preference is given to aluminothermic mixtures in which the metallic additives consist of pure iron and an appropriate master alloy. In this case, the addition of a quantity of from 5 to 35 parts by weight, relative to 100 parts by weight of base portion, has proven suitable, 10 to 30% of pure iron and 5 to 30% of master alloy being used.

Particular preference is given to an aluminothermic mixture to which 5 to 15% by weight of master alloy and 5 to 20% by weight of iron, each relative to the base portion, have been added as metallic additives.

In this case, in order to achieve hardnesses of between 150 and more than 400 HB in the weld material, measured on the running surface, the master alloy has a composition of (in % by weight)

C: 0.5 to 8
Si: 5 to 20
Cr: 10 to 60 and iron with impurities resulting from manufacture, preferably

C: 1.0 to 6.0
Si: 10 to 15
Cr: 15 to 50 and iron with impurities resulting from manufacture.

Furthermore, a particularly advantageous 5 master alloy has proven to be one which consists of (in % by weight):

C: 0.1 to 20
Cr: 5 to 80 and iron with impurities resulting from manufacture, and which is added in a quantity of from 5 to 50% by weight, relative to the base portion.

Tables 1 to 3 show by way of example how weld portions can be produced for four different hardness classes of the Thermit weld. Table 1 shows a base recipe.

TABLE 1

Recipe for the welding portions

| Base portion: | in % |
|---|---|
| Pure thermite (RT) | |
| Aluminum | 25.0 |
| Fe oxide | 75.0 |
| Total RT | 100.0 |
| Additives: | |
| Pure iron | 12.5 |
| Master alloy | 7.5 |
| Total of the weld mass | 120.0 |

Table 2 shows the preferred ranges for compositions of the master alloys employed for different target degrees of hardness of the weld.

TABLE 2

Compositions of the master Alloy

| Hardness (HB) | 250–300 | 300–350 | 350–400 | >400 |
|---|---|---|---|---|
| Master alloy (%) | | | | |
| Cr | 28–31 | 33–36 | 34–37 | 38–41 |
| Si | 10–15 | 10–15 | 10–15 | 10–15 |
| C | 1.5–2.0 | 2.0–2.7 | 3.3–4.0 | 4.0–4.5 |
| Remainder Fe | up to 100 | up to 100 | up to 100 | up to 100 |

Table 3 shows the analyses of the welds carried out with the welding portions shown in Table 2. The Mn concentrations found are impurities resulting from the dissolved rail steel.

TABLE 3

Analysis of the welds on the running surface

| | C % | Al % | Cr % | Mn % | Ni % | Si % |
|---|---|---|---|---|---|---|
| Hardness class 250–300 | 0.1–0.3 | <0.5 | 1.6–2.4 | <0.5 | <0.2 | 0.5–1.5 |
| Hardness class 300–350 | 0.15–0.35 | <0.5 | 2.0–2.8 | <0.5 | <0.2 | 0.5–1.5 |
| Hardness class 350–400 | 0.25–0.45 | <0.5 | 2.2–3.0 | <0.5 | <0.2 | 0.5–1.5 |
| Hardness class >400 | 0.35–0.55 | <0.5 | 2.4–3.2 | <0.5 | <0.2 | 0.5–1.5 |

The quantitative additions for obtaining the desired chemical composition of the weld material can easily be determined for each case by a welding trial. The aluminothermic mixture according to the invention thus makes it possible to produce a weld material for aluminothermic rail welding which corresponds, in its chemical composition and microstructure formation and also in hardness, to the various rail steels to be welded, ensuring in particular uniform wearing behavior of the weld material and rail material and hence a defect-free and maintenance-free track. Furthermore, it becomes possible to produce a pearlitic microstructure consisting of troostite/sorbite components in conjunction with a granular morphology of the upper bainitic structure. Due to the fine-grained character, such a microstructure is distinguished by improved wear resistance. In accordance with demand, the use of the granules shows a uniform, low-smoke and steady reaction behavior with a constant weld quality. Compared with a welding mixture of the prior art, the advantage of the aluminothermic mixtures according to the invention is the avoidance of additives which lead to increased smoke evolution and higher reactivity. This more uniform and calmer metallothermic reaction is not only metallurgically important, but also reduces the exposure of the welding personnel to splashes of molten material and to fumes from the reacting mixture, which are a nuisance particularly during welding work in tunnels or underground railways. A further advantage is the wider range of hardness levels that can be produced and improved wearing behavior.

What is claimed is:

1. An aluminothermic mixture consisting of a finely particulate base portion of iron oxide and aluminum, and from 5 to 50% by weight, relative to the base portion, of a master alloy which is a ferrochromium alloy consisting of (in % by weight)

C: 0.1 to 20

Si: 2 to 40

Cr: 5 to 80 and said mixture further consisting of iron with impurities resulting from manufacture.

2. An aluminothermic mixture as claimed in claim 1, wherein the master alloy comprises from 10 to 40% by weight, relative to the base portion.

3. An aluminothermic mixture as claimed in claim 1, wherein the master alloy comprises from 15 to 30% by weight, relative to the base portion.

4. An aluminobhermic mixture as claimed in any one of claims 1 to 3, wherein the master alloy is a ferrochromium alloy consisting of (in % by weight)

C: 0.5 to 8

Si: 5 to 20

Cr: 10 to 60 and said mixture further consisting of iron with impurities resulting from manufacture.

5. An aluminothermic mixture as claimed in any one of claims 1 to 3, wherein the master alloy is a ferrochromium alloy consisting of (in % by weight)

C: 1.0 to 6.0

Si: 10 to 15

Cr: 15 to 50 and said mixture further consisting of iron with impurities resulting from manufacture.

6. An aluminothermic mixture consisting of a finely particulate base portion of iron oxide and aluminum, and from 5 to 50% by weight, relative to the base portion, of a master alloy which is a ferrochromium alloy consisting of (in % by weight)

C: 0.1 to 20

Si: 2 to 40

Cr: 5 to 80 and said mixture further consisting of pure iron.

7. An aluminothermic mixture as claimed in claim 6, comprising 5 to 45% by weight of master alloy and 5 to 45% by weight of pure iron, each relative to the base portion.

8. An aluminothermic mixture as claimed in claim 6, comprising 5 to 30% by weight of master alloy and 10 to 30% by weight of pure iron, each relative to the base portion.

9. An aluminothermic mixture as claimed in claim 6, comprising 5 to 15% by weight of master alloy and 5 to 20% by weight of pure iron, each relative to the base portion.

10. An aluminothermic mixture consisting of a finely particulate base portion of iron oxide and aluminum, and from 5 to 50% by weight, relative to the base portion, of a master alloy which is a ferrochromium alloy consisting of (in % by weight)

C: 0.1 to 20

Cr: 5 to 80 and said mixture further consisting of iron with impurities resulting from manufacture.

* * * * *